United States Patent Office 3,352,683
Patented Nov. 14, 1967

3,352,683
PYRIDINES AND POULTRY FEEDSTUFFS AND ADDITIVES THEREOF CONTAINING PYRIDINES
Paul Schmidt, Therwil, Basel-Land, Max Wilhelm, Allschwil, Kurt Eichenberger, Therwil, Basel-Land, and Eduard Schumacher, Dornach, Switzerland, assignors to Ciba Corporation, New York, N.Y., a corporation of Delaware
No Drawing. Filed Mar. 20, 1967, Ser. No. 624,209
Claims priority, application Switzerland, Feb. 8, 1961, 1,472/61; Oct. 13, 1966, 14,792/66
23 Claims. (Cl. 99—2)

ABSTRACT OF THE DISCLOSURE

The invention concerns compounds of the formula

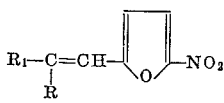

in which $R_1$ is an optionally substituted pyridyl-(2) or quinolyl-(2) radical and R stands for hydrogen, a lower alkyl or an optionally substituted phenyl radical which compounds are useful as antibacterial and antiparasitic agents, and poultry feedstuffs or additives thereto containing compounds of the formula

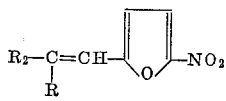

in whch R has the above meaning and $R_2$ stands for an optionally substituted pyridyl-(2) or -(4) or quinolyl-(2) or -(4) radical.

---

This application is a continuation in part of our application Ser. No. 366,630 filed May 11, 1964, now abandoned, which is itself a continuation in part of our application Ser. No. 169,606 filed Jan. 29, 1962, now abandoned.

The present invention relates to new heterocyclic compounds. More particularly it concerns heterocyclic compounds containing a pyridine ring and in α-position to the pyridine nitrogen atom a 5-nitrofuryl-(2)-methylidene-methyl radical, and salts thereof.

Heterocyclic compounds containing a pyridine ring, hereinafter referred to as pyridine compounds, are for example, pyridines which may be unsubstituted in the other positions or contain one or several substituents.

As substituents there may be mentioned above all lower alkyl such as methyl, ethyl or propyl radicals, branched or unbranched butyl, pentyl or hexyl radicals bound in any desired position, hydroxyl, acyloxy, such as lower alkanoyloxy or lower alkoxy groups, for example alkoxy groups corresponding to the alkyl radicals mentioned; halogen atoms such as fluorine, chlorine or bromine, halogen-alkyl radicals such as trifluoromethyl; nitro or amino groups, such, for example, as mono- or di-lower alkylamino or alkyleneamino groups in which the hydrocarbon radicals may be interrupted by hetero atoms such as nitrogen, oxygen or sulfur, such as dimethylamino, diethylamino, pyrrolidino, piperidino, morpholino or piperazino groups which may be N-substituted, or N-acylamino groups, such as N-lower alkanoyl-amino groups, e.g. the acetyl-amino group. Further suitable substituents are fused-on rings, such for example as aromatic radicals such as benzene rings, which together with the pyridine nucleus form e.g. a quinoline nucleus. These fused-on rings may also be substituted, for example as mentioned above for pyridine ring. The α-methyl group at the pyridine ring may contain in addition to the furfurylidene radical other substituents, for example one of the aforementioned alkyl or a phenyl radical, which latter may also be substituted as indicated above.

The new compounds possess valuable biological properties. Inter alia they are distinguished by their high antibacterial action, above all towards pathogens, such for example, as staphylococci, streptococci, Salmonella, coli bacilli, Shigellae and above all towards tubercle bacilli. They are also active against pathogenic moulds, protozoae and vermiculae, for example schistosomes and oxyuris. They may therefore be used pharmacologically on animals or as medicaments or disinfectants in human or veterinary medicine for the treatment of such diseases, for example mycoses, tuberculosis, leprosy or schisto somiasis, or as additives to animal fodder. They are also valuable intermediates.

Particularly valuable by virtue of their antibacterial effect, above all on tubercle bacilli, are α-(5-nitrofurfurylidene-methyl)-pyridines and -quinolines which may be substituted, for example as described above, and their salts, above all the α-(5-nitrofurfurylidene-methyl)-quinoline which is also very active against oxyuris and corresponds to the formula

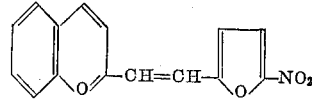

and its salts, primarily the 2-(5'-nitrofurfurylidene-methyl)-pyridine of the formula

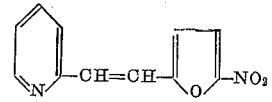

and 2-(5'-nitrofurfurylidene-methyl)-6-methyl-pyridine of the formula

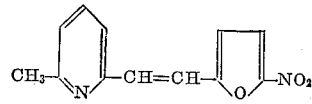

and their salts.

The new compounds are obtained by a process in which a pyridyl-compound which carries in α-position to the pyridine ring nitrogen atom a radical bound to the α-position by a reactive —CH$_2$-group is reacted with a 5-nitro-furyl-carbonyl compound, water being eliminated and an optionally substituted ethylene-(1:2)-bridge formed.

Advantageously, a compound of the formula

where R' represents hydrogen or an alkyl or optionally substituted phenyl radical and R is a pyridyl-(2)-radical is reacted with a 5-nitro-furan-2-carbonyl compound. Advantageously, the reaction is performed with 5-nitrofuran-(2)-aldehyde.

The reaction is performed in the conventional manner, if desired in the presence of a condensing agent or catalyst, for example in the presence of an agent capable of splitting off water, at room temperature or preferably at an elevated temperature; the water formed may be continuously removed from the reaction mixture. A hydroxy compound, such as 8-hydroxy-quinaldine or an amino-compound, such as 6-amino-quinaldine may be reacted under acylating conditions, whereby the acyloxy or acylamino compound is obtained. From the acylamino- or acyloxy-compounds thus obtained, the acyl group may be split off in the usual manner, e.g. by hydrolysis with an acid to obtain the free hydroxy or amino compounds, respectively.

Depending on the reaction conditions and starting materials used the new compounds are obtained in the free form or in the form of their salts. A resulting free base, depending on its basicity, may form salts with inorganic or organic acids. On the other hand, a resulting salt of the new compounds may be converted in a manner known per se into a free compound, for example an acid addition salt, by reaction with a basic agent. These conversions may serve to purify the free bases. Acid addition salts are preferably prepared with therapeutically useful acids, for example hydrohalic acids such as hydrochloric or hydrobromic acid, perchloric, nitric or thiocyanic acid, sulfuric or phosphoric acids, or organic acids such as formic, acetic, propionic, glycollic, lactic, pyruvic, oxalic, malonic, succinic, maleic, fumaric, malic, tartaric, citric ascorbic, hydroxymaleic, dihydroxymaleic, benzoic, phenylacetic, 4-aminobenzoic, 4-hydroxybenzoic, anthranilic, cinnamic, mandelic, salicylic, 4-aminosalicylic, embonic, 2-phenoxybenzoic, 2-acetoxybenzoic, methanesulfonic, ethanesulfonic, hydroxyethanesulfonic, benzenesulfonic, paratoluenesulfonic, naphthalenesulfonic or sulfanilic acid; or methionine, tryptophan, lysine or arginine.

The new compounds are intended to be used as medicaments in the form of pharmaceutical preparations containing said compounds in conjunction with organic or inorganic, solid or liquid pharmaceutical excipients suitable for enteral (for example oral), parenteral or local administration. Suitable excipients are substances that do not react with the new compounds such, for example, as water, gelatine, lactose, starches, magnesium stearate, talc, vegetable oils, benzyl alcohols, gums, polyalkylene glycols, white petroleum jelly, cholesterol or other known pharmaceutical excipients. The pharmaceutical preparations may be, for example, tablets, dragees, capsules, creams or ointments, or in liquid form solutions, suspensions or emulsions. The creams or ointments may for example contain from 0.1–2% of the active compound, preferably from 0.25–1%. They may be sterilized and/or may contain assistants such as preserving, stabilizing, wetting or emulsifying agents, salts for regulating the osmotic pressure, or buffers. They may also contain further therapeutically valuable substances. The compounds may also be used as disinfectants in the customary manner, for example together with an ordinary carrier.

The invention also concerns poultry feedstuffs and additives to poultry feedstuffs containing heterocyclic compound which contain a pyridine ring which carries in α- or γ-position to the nitrogen atom a 5-nitrofuryl-(2)-methylidene-methyl radical or quarternary ammonium derivatives, N-oxides or salts thereof.

The heterocyclic compounds containing a pyridine ring, hereinafter referred to as pyridine compounds, are for example pyridines which may be unsubstituted in the other positions or contain one or several substituents, the substituents being for example those mentioned above for the new pyridine compounds.

The 2- or 4-methyl groups at the pyridine ring may contain in addition to the furfurylidene radical other substituents, for example one of the aforementioned alkyl or phenyl radicals, which latter may also be substituted as indicated above.

Examples of quarternary ammonium derivatives are more especially those in which the quaternary nitrogen atom contains as fourth substituent an aliphatic or araliphatic hydrocarbon radical, such as a lower alkyl radical, for example one of those mentioned above, or a lower alkenyl radical, for example allyl, or a benzyl or phenethyl radical in which the phenyl radicals may be substituted, for example as shown above.

As salts of the compounds contained in the new poultry feedstuffs or in the additives thereto there may be mentioned primarily those described above.

The 4-(5'-nitrofurfurylidine-methyl)-pyridines and quinolines can be prepared in an analogous way to that described above for the 2-(5'-nitrofurfurylidene-methyl) compounds.

The N-oxides of the 2- and 4-(5'-nitrofurfurylidene-methyl)-pyridines and -quinolines are prepared in the usual manner, for example by treatment with an N-oxidant, such as hydrogen peroxide, ozone, persulphuric acid or an organic peracid, such as a percarboxylic acid, for example peracetic, perbenzoic, monoperphthalic or a persulfonic such as perparatoluenesulfonic acid.

The poultry feedstuffs and the poultry feedstuffs additives containing the aforementioned compounds have valuable properties. In particular, they bring about better food absorption and increase in weight of the animals. They may be primarly used as chicken feed or feedstuff additives.

Especially valuable are the poultry feedstuffs and feedstuff additives containing 4- or particularly 2-(5'-nitrofurfurylidene-methyl)-pyridines or -quinolines, which may be substituted at the pyridine or quinoline radicals and/or at the ethylene radical, for example as shown above, or their salts or N-oxides, and especially those containing 4- or particularly 2-(5'-nitrofurfurylidene-methyl)-quinolines having a free amino group at the quinoline ring. Preferred specific compounds are 2- or 4-(5'-nitrofurfurylidene-methyl)-quinolines of the formulae

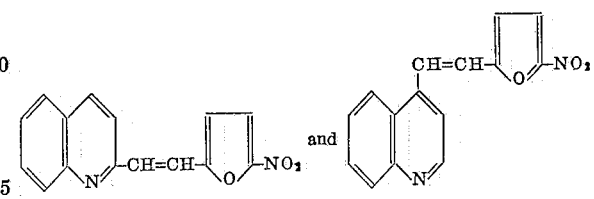

or 2- or 4-(5'-nitrofurfurylidene-methyl)-pyridine of the formulae

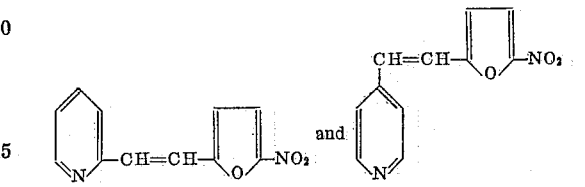

or 2-(5'-nitrofurfurylidene-methyl)-6-methyl-pyridine of the formula

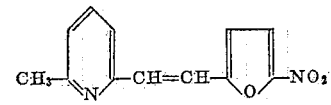

or 4-(5'-nitrofurfurylidene-methyl)-2-amino-quinoline of the formula

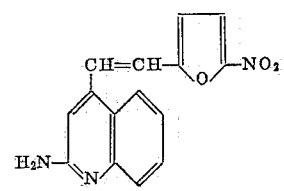

or 2-(5'-nitrofurfurylidene-methyl)-8-amino-quinoline of the formula

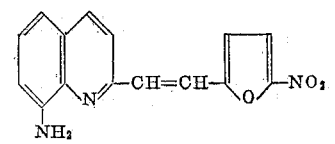

or particularly 2-(5'-nitrofurfurylidene-methyl)-6-aminoquinoline of the formula

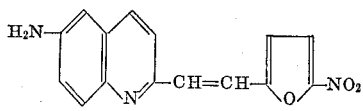

or their N-oxides or non-toxic salts.

Of the above compounds contained in the poultry feedstuffs and feedstuff additives those are especially valuable which have a 2-pyridyl or 2-quinolyl radical, particularly those of this group given preference above.

The poultry feedstuffs of the present invention contain about 2 to 200 grams, particularly 5 to 100 grams of active substance per ton which makes an average daily dose of about 0.2 to 4 mg. of active substance. The content of active ingredient in the poultry feedstuffs can vary within a wide range, so that more precise data in this respect are superfluous. In addition to the afore-mentioned active substances the poultry feedstuffs contain the customary constituents, such as grains, protein additives, mineral salts, herbage, vitamin additives, antimicrobial agents, especially antibiotics and other substances in the amounts known to be an optimum for the individual feedstuffs. Examples of suitable ingredients for feeds are: Barley, barley flour, buckwheat, maize, cornmeal, sorghum, oats, porridge, oatmeal, oat flakes, rye, wheat, wheat shorts, wheat scrap, milk, bone meal, meat meal, meat scraps, maize, gluten meal, oil cake meal, soyabean flour, dairy residues, fish meal, corn distillers' solubles, lucernes, dried lucerne flour, clover, grass, cabbage, savoy cabbage, codliver oil and similar nutrients; also mineral additives such as dicalcium phosphate, calcium carbonate, iodized salt, manganese sulphate, zinc salts, cobalt salts, iron salts or copper salts, vitamins, e.g. vitamin A, niacin, calcium pantothenate, thiamin, riboflavin, vitamin $B_{12}$, ascorbic acid, vitamin D or vitamin E; other essential additives, for example butyloxytoluene, or methionine, antimicrobial agents, especially antibiotics, for example bacitracin, penicillin, tetracyclin, chlorotetracyclin, oxytetracyclin or erythromycin.

It is advantageous to prepare a premix containing the active substance in admixture or conjunction with a suitable carrier. Such carriers are, for example, wheat scraps, starches, cane sugar, lactose, mannitol, sodium gluconate, soyabean feeds extracted with solvents or other suitable admixtures; other additives, such as buffers or buffer systems, for example citric acid+sodium citrate, sodium acetate, dipotassium phthalate+phthalic acid, sodium benzoate+benzoic acid, sodium lactate+lactic acid or sodium fumarate+fumaric acid; wetting agents, such as salts of ethylenediamine tetraacetic acid (which may also contain monosodium salts of N,N-bis-(2-hydroxyethyl)-glycine) or other suitable substances, such as antioxidants or stabilizers. A premix contains about 0.1 to about 20%, particularly 0.5 to about 10% of the active substance in conjunction with an appropriate mixture of carriers and assistants.

These feedstuffs are prepared by known methods by adding the premix to feedstuffs in an amount such that the final product has the desired concentration of active ingredient. Alternatively, the active substances may be administered in solution or dispersion, for example in drinking water or in any other desired form.

The following examples illustrate the invention.

*Example 1*

A mixture of 14 grams of 5-nitrofurfural, 10 grams of α-picoline and 10 cc. of acetic anhydride is heated for 6 hours at 100° C. The reaction product is then pasted with 100 cc. of 2 N-hydrochloric acid and the insoluble matter is filtered off. The filtrate is alkalinized by adding a saturated solution of sodium bicarbonate, whereupon a yellow precipitate of α-(5-nitrofurfurylidene-methyl)-pyridine of the formula

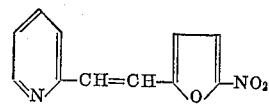

forms which melts at 170 to 171° C. after recrystallization from butanol.

*Example 2*

A mixture of 19 grams of 5-chloro-8-hydroxyquinaldine, 14 grams of 5-nitrofurfural and 50 cc. of acetic anhydride is heated for 3 hours at 100° C., then cooled and treated with 100 cc. of 5 N-hydrochloric acid. The precipitate is filtered off and the filtrate is alkalinized by adding saturated potassium carbonate solution. A yellow precipitate forms which is filtered off and recrystallized from glacial acetic acid, to yield 2-(5'-nitrofurfurylidene-methyl)-5-chloro-8-hydroxyquinoline of the formula

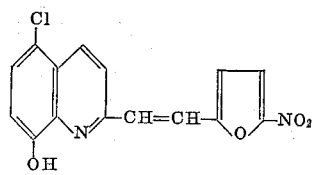

in crystals melting at 244 to 245° C.

*Example 3*

A solution of 13.5 grams of 5:8-dichloroquinaldine and 9 grams of 5-nitrofurfural in 20 cc. of acetic anhydride is heated for 3 hours at 100° C. The precipitate is suctioned off and recrystallized from glacial acetic acid, to yield 2-(5'-nitrofurfurylidene - methyl)-5:8-dichloroquinoline of the formula

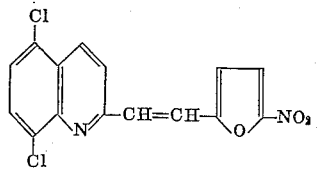

in yellow crystals melting at 135 to 136° C.

*Example 4*

A mixture of 14 grams of 5-nitrofurfural, 14 grams of quinaldine and 20 cc. of acetic anhydride is heated for 3 hours at 100° C. The resulting yellow precipitate is filtered off and recrystallized from glacial acetic acid, to yield 2-(5'-nitrofurfurylidene-methyl)-quinoline of the formula

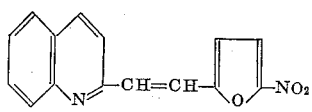

in crystals melting at 177 to 178° C.

*Example 5*

A solution of 16 grams of 8-hydroxyquinaldine and 14 grams of 5-nitrofurfural in 25 cc. of acetic anhydride is heated for 3 hours at 100° C. The precipitate is filtered off and recrystallized from glacial acetic acid, to yield 2-(5'-nitrofurfurylidene-methyl)-8-acetoxyquinoline of the formula

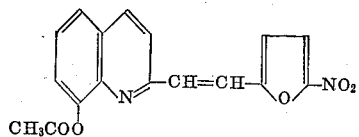

in yellow crystals melting at 167 to 168° C.

Example 6

A mixture of 20 grams of 5 - nitrofurfural and 13 grams of 2:6 - lutidine is heated for 3 hours at 100° C. and then filtered. The filtrate is alkalinized with saturated sodium bicarbonate solution. The resulting yellow precipitate is filtered off and recrystallized from butanol, to yield 2 - (5' - nitrofurfurylidene - methyl) - 6 - methylpyridine of the formula

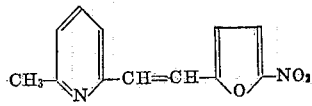

in crystals melting at 149 to 150° C.

This compound has a particularly specific effect on schistosomes.

Example 7

A mixture of 10 grams of 6 - nitro - quinaldine and 7 grams of 5 - nitro - furfural is heated in 40 cc. of acetic anhydride for 3 hours at 130° C. 100 cc. of 2 N - hydrochloric acid are then added and the precipitate filtered off and recrystallized from dimethylformamide, to yield 2 - (5' - nitrofurfurylidene - methyl) - 6 - nitro - quinoline of the formula

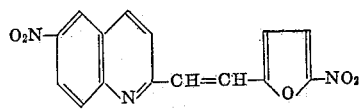

in yellow crystals melting at 253–254° C.

Example 8

A mixture of 10 grams of 2 - benzyl - pyridine and 7 grams of 5 - nitro - furfural is heated in 20 cc. of acetic anhydride for 1 hour at 130° C. 50 cc. of 2 N - hydrochloric acid are then added, the solution filtered through active carbon and the filtrate cautiously rendered neutral by the addition of sodium carbonate solution. An oil precipitates which crystallizes slowly. By recrystallization from a small amount of ethanol there is obtained 2 - [α-(5' - nitro - furfurylidene) - benzyl] - pyridine of the formula

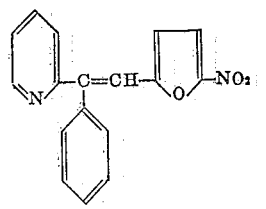

in yellow crystals melting at 94–95° C.

In an analogous manner there may be obtained the 2 - [1 - (5' - nitrofurfurylidene) - ethyl] - pyridine of

Example 9 melting point 151–152° C.

A solution of 7.4 g. of 2 - methyl - 6 - amino - quinoline and 6 g. of 5 - nitro - furfural in 75 cc. of acetic anhydride is heated at 130° C. for 2 hours. The precipitate that forms is filtered off with suction and recrystallized from dimethylformamide+ethanol. There is obtained crystalline 2 - (5' - nitro - furfurylidene - methyl) - 6 - acetamido - quinoline which melts at 284–286° C.

12 g. of 2 - (5' - nitrofurfurylidene - methyl) - 6 - acetamido - quinoline are boiled for 3 hours with 120 cc. of 2 N - hydrochloric acid in 120 cc. of methanol. The precipitate that forms is filtered off with suction, extracted by being boiled with 50 cc. of dimethylformamide, and the sparingly soluble 2 - (5' - nitrofurfurylidene-methyl) - 6 - amino - quinoline hydrochloride of the formula

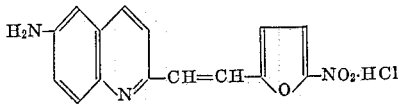

then filtered off with suction. The compound melts above 300° C.

Example 10

The new compounds can be compounded into cream or ointments. Thus, a cream having the following composition may be made:

| | Percent |
|---|---|
| 2-(5'-nitro-furfurylidene-methyl)-pyridine | 1 |
| Liquid paraffin | 2 |
| White petroleum jelly | 97 |

The preparation of this cream is carried out as follows:

The finely pulverized 2 - (5' - nitro - furfurylidene-methyl) - pyridine is homogenized in the liquid paraffin and part of the melted white petroleum jelly; the remainder of the melted petroleum jelly is added and the whole then stirred at room temperature. The cream is homogenized in the conventional manner.

Example 11

Preparation of poultry feed from the following ingredients:

| Main ingredients (premix): | G. |
|---|---|
| 2 - (5'-nitrofurfurylidenemethyl)-6-amino-quinoline | 44.000 |
| Wheat, medium standard (30–80 mesh) | 10,956.000 |
| Total weight | 11,000.000 |

| Additives: | |
|---|---|
| Cornmeal | 1,062.875 |
| Fat | 80.000 |
| Fish meal, 60% protein | 100.000 |
| Soybean flour, 50% protein | 500.000 |
| Gluten flour | 100.000 |
| Alfalfa flour, dried | 50.000 |
| Corn distillers' solubles | 40.000 |
| Dicalcium phosphate | 28.000 |
| Calcium carbonate | 20.000 |
| Iodized salt | 10.000 |
| Vitamins A and D ($10^6$ A units and $25.10^4$ D units per pound) | 4.000 |
| Calcium pantothenate | 0.250 |
| Butyl-oxytoluene | 0.250 |
| Choline chloride of 25% strength | 2.500 |
| Riboflavin (24 g./pound) | 0.125 |
| Vitamin $B_{12}$ (0.02 g./pound) | 1.000 |
| Methionine | 0.500 |
| Manganese sulphate | 0.500 |
| Total weight | 2,000.000 |

The additives are admixed in the following manner:

Approximately half the cornmeal is poured into the mixer, and the remainder is mixed with the heated, liquefied fat and added, and the whole is mixed until the fat has been evenly dispersed. Then manganese sulphate, dicalcium phosphate, calcium carbonate and iodized salt are added, and then during the mixing the fish meal, soyabean flour, gluten and alfalfa flour and the corn distillers' solubles. The batch is thoroughly mixed and then the vitamins A and D, calcium pantothenate, choline chloride, riboflavin, vitamin $B_{12}$, methionine and butyl-oxytoluene are added in this sequence, and the whole is mixed until all the ingredients have been evenly dispersed. When this point is reached, the thoroughly mixed main ingredients are added in an amount such that 50 g. of active substance are evenly distributed in each ton of the feed composition.

*Example 12.—Feed additive*

Ingredients:                                                                G
    2 - (5' - nitrofurfurylidenemethyl) - 6-aminoquinoline _____ 23.00
    Cane sugar _____ 100.00
    Soyabean residues (after extraction) ____ 877.00

Total weight _____ 1,000.00

The ingredients are intimately mixed and the resulting mixture may be added in the desired amount to any desired feed. For example such a mixed feed may consist of:

Ingredients:                                                           Grams
    Alfalfa flour _____ 50.00
    Yellow maize _____ 1,215.00
    Gluten flour _____ 50.00
    Animal fat _____ 40.00
    Dried malt brewers' grains _____ 25.00
    Fish meal _____ 100.00
    Oyster shells _____ 15.00
    Poultry feed additive _____ 100.00
    Soyabean flour _____ 380.00
    Salt _____ 5.00
    Mixture of trace elements _____ 0.50
    Dicalcium phosphate _____ 15.00
    Vitamin mixture _____ 5.00

2,000.50

The above feed additive is added to the well mixed ingredients of the feed.

*Example 13*

A chickfeed is prepared from the following ingredients:

2 - (5' - nitrofurfurylidenemethyl) - 6-aminoquinoline _____grams__ 50
Mixed feed:                                                      Kilograms
    Cornmeal _____ 550.00
    Soyabean flour, 44% protein _____ 306.00
    Lucerne flour _____ 20.00
    Dicalcium phosphate _____ 20.00
    Powdered lime _____ 6.00
    Salt _____ 2.00
    Fish meal, 60% protein _____ 25.00
    Stabilized fat _____ 40.00
    Dried whey _____ 25.00
    Manganese sulphate _____ 0.20
    Zinc oxide _____ 0.10
    D,l-methionine _____ 0.70
    Vitamin mixture _____ 5.00

1,000.00

5.00 kilograms of the vitamin mixture contain 16,000,000 international units of vitamin A, 1,000,000 of vitamin $D_3$, 5000 of vitamin E-acetate, 6 g. of vitamin $K_3$, 6 mg. of vitamin $B_{12}$, 3 g. of riboflavin, 30 g. of niacin, 5 g. of calcium pantothenate, 100 g. of 1,2-dihydro-6-ethoxy-2,2,4-trimethylquinoline and cornmeal to make a total weight of 5.00 kg.

The active substance is premixed with about 1 kg. of the mixed feed. The pre-mixture is stirred with a further quantity of the mixed feed so that about 25 kg. of mixture are obtained. This mixture is then mixed with the bulk of the mixed feed in a horizontal mixer.

As active ingredients there may be used instead of those mentioned in Examples 11 to 13 any one of the following compounds:

2-(5'-nitrofurfurylidenemethyl)-pyridine, M.P. 170–171° C., 2-(5'-nitrofurfurylidenemethyl)-5-chloro-8-hydroxyquinoline, M.P. 244–245° C., 2-(5'-nitrofurfurylidenemethyl)-pyridine iodomethylate, M.P. 229° C., 2-(5'-nitrofurfurylidenemethyl)-5,8-dichloroquinoline, M.P. 135–136° C., 2-(5'-nitrofurfurylidenemethyl)-quinoline, M.P. 177–178° C.; N-oxide 211–212° C. with decomposition, 2-(5'-nitrofurfurylidenemethyl)-8-acetoxyquinoline, M.P. 174–175° C., 2-(5'-nitrofurfurylidenemethyl)-6-methylpyridine, M.P. 149–150° C., 2-(5'-nitrofurfurylidenemethyl)-6-nitroquinoline, M.P. 253–254° C., 2-(5'-nitrofurfurylidenemethyl)-benzylpyridine, M.P. 94–95° C., 2-(5'-nitrofurfurylidenemethyl)-6-acetylaminoquinoline, M.P. 284–286° C., 2-(5'-nitrofurfurylidenemethyl)-4-acetylaminoquinoline, M.P. 276° C. with decomposotion, 2-(5'-nitrofurfurylidenemethyl)-4-aminoquinoline, M.P. 240° C. with decomposition; lactate M.P. 171–172° C., 2-(5'-nitrofurfurylidenemethyl)-4-methylquinoline, M.P. 179° C., 2-(5'-nitrofurfurylidenemethyl)-4-methoxyquinoline, M.P. 253° C. with decomposition, 2-(5'-nitrofurfuylidenemethyl)-5-nitroquinoline, M.P. 269° C. with decomposition, 2-(5'-nitrofurfurylidenemethyl)-5-acetylaminoquinoline, M.P. 277° C. with decomposition; N-oxide M.P. 251° C. with decomposition, 2-(5'-nitrofurfurylidenemethyl)-5-aminoquinoline, M.P. 221° C. with decomposition, 2-(5'-nitrofurfurylidenemethyl)-8-nitroquinoline, M.P. 229°C., 2-(5'-nitrofurfurylidenemethyl)-8-acetylaminoquinoline, M.P. 190° C., 2-(5'-nitrofurfurylidenemethyl)-8-aminoquinoline, M.P. 178° C., 2-(5'-nitrofurfurylidenemethyl)-8-methoxyquinoline, M.P. 149° C., 4-(5'-nitrofurfurylidenemethyl)-quinoline, M.P. 153° C.; N-oxide M.P. 228° C., 4-(5'-nitrofurfurylidenemethyl)-2-acetylaminoquinoline, M.P. 217–218° C., 4-(5'-nitrofurfurylidenemethyl)-2-aminoquinoline, M.P. 227° C. with decomposition; lactate M.P. 195–196° C., 4-(5'-nitrofurfurylidenemethyl)-8-nitroquinoline, M.P. above 280° C., 2-(5'-nitrofurfurylidenemethyl)-4,6-diaminoquinoline hydrochloride, M.P. above 290° C., 9-(5'-nitrofurfurylidenemethyl)-acridine, M.P. 185° C., 2-(5'-nitrofurfurylidenemethyl)-8-hydroxyquinoline, M.P. 243–245° C., 2-(5'-nitrofurfurylidenemethyl)-pyridine iodoethylate, M.P. above 300° C., 2-(5'-nitrofurfurylidenemethyl)-6-methylpyridine iodomethylate, M.P. 226° C. with decomposition, 2-(5'-nitrofurfurylidenemethyl)-6-dimethylaminoquinoline iodomethylate, M.P. 170° C. with decomposition, 2-(5'-nitrofurfurylidenemethyl)-6-diethylaminoquinoline iodomethylate, M.P. above 300° C.

4-(5'-nitrofurfurylidenemethyl)-pyridine, M.P. 167–168° C.; N-oxide M.P. 223–225° C., 4-[1-(5'-nitrofurfurylidene)-ethyl]-pyridine, M.P. 154–156° C.; N-oxide M.P. 202–203° C., 2-[1-(5-nitrofurfurylidene)-ethyl]-pyridine, M.P. 151–152° C.; N-oxide M.P. 192–193° C.

What is claimed is:

1. A member selected from the group consisting of 1-(5-nitrofuryl)-2-R-2-R'-ethylene, wherein R is a member selected from the group consisting of hydrogen, lower alkyl, phenyl and phenyl substituted by a member selected from the group consisting of lower alkyl, lower alkoxy, halogeno, trifluoromethyl, nitro, oxy, lower alkanoyloxy, amino, mono- and di-lower alkylamino and lower alkanoylamino, and R' is a member selected from the group consisting of pyridyl-2 and quinolyl-2 and such substituents substituted by not more than two members selected from the group consisting of lower alkyl, lower alkoxy, halogeno, oxy, lower alkanoyloxy, nitro, amino, mono- and di-lower alkylamino, trifluoromethyl, and therapeutically useful acid addition salts thereof.

2. A compound as claimed in claim 1, said compound being 2-(5'-nitro-furfurylidene-methyl)quinoline of the formula

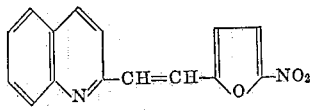

3. A compound as claimed in claim 1, said compound being 2-(5'-nitro-furfurylidene-methyl)-pyridine of the formula

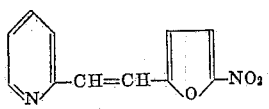

4. A compound as claimed in claim 1, said compound being 2 - (5'-nitro-furfurylidene-methyl)-6-methyl-pyridine of the formula

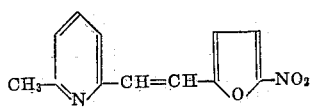

5. A compound as claimed in claim 1, said compound being 2-(5'-nitro-furfurylidene-methyl)-5 - chloro - 8 - hydroxy-quinoline of the formula

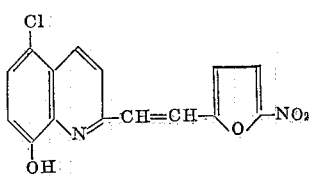

6. A compound as claimed in claim 1, said compound being 2-(5'-nitro-furfurylidene - methyl) - 5:8 - dichloro-quinoline of the formula

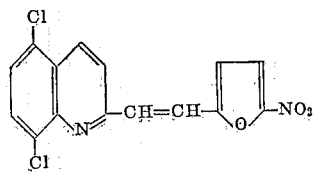

7. A compound as claimed in claim 1, said compound being 2-(5' - nitro - furfurylidene - methyl) - 8 - acetoxy-quinoline of the formula

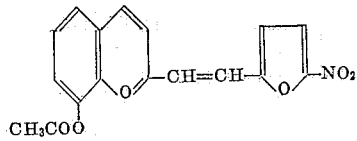

8. A compound as claimed in claim 1, said compound being 2-(5'-nitro-furfurylidene - methyl) - 6 - nitro-quinoline of the formula

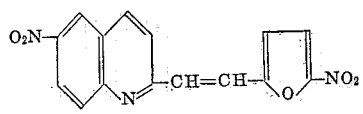

9. A compound as claimed in claim 1, said compound being 2-[α-(5-nitro-furfurylidene) - benzyl] - pyridine of the formula

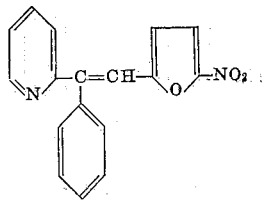

10. A compound as claimed in claim 1, said compound being 2-(5'-nitro-furfurylidene - methyl) - 6 - acetylamino-quinoline of the formula

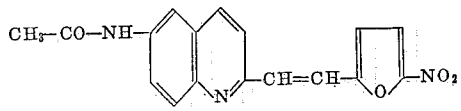

11. A compound as claimed in claim 1, said compound being 2-(5'-nitro-furfurylidene - methyl) - 6 - amino-quinoline of the formula

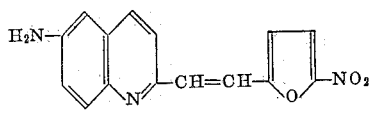

12. A compound as claimed in claim 1, said compound being a therapeutically useful acid addition salt of the compound claimed in claim 11.

13. A member selected from the group consisting of 1-(5-nitrofuryl)-2-R-2-R'-ethylene, wherein R is a member selected from the group consisting of hydrogen, lower alkyl, phenyl and phenyl substituted by a member selected from the group consisting of lower alkyl, lower alkoxy, halogeno, trifluoromethyl, nitro, oxy, lower alkanolyloxy, amino, mono- and di-lower alkylamino and lower alkanylamino, and R' is a member selected from the group consisting of pyridyl-2- and quinolyl-2-radicals substituted by a lower alkanoylamino group and therapeutically useful acid addition salts thereof.

14. A poultry feedstuff or feed premix thereof containing a member selected from the group consisting of 1-(5-nitrofuryl)-2-R-2-R'-ethylene, wherein R is a member selected from the group consisting of hydrogen, lower alkyl, phenyl and phenyl substituted by a member selected from the group consisting of lower alkyl, lower alkoxy, halogeno, and trifluoromethyl and R' is a member selected from the group consisting of pyridyl-2, pyridyl-4, quinolyl-2 and quinolyl-4 and such substituents substituted by at least one member selected from the group consisting of lower alkyl, lower alkoxy, halogeno, oxy, lower alkanoyloxy, nitro, amino, mono- and di-lower alkylamino, trifluoromethyl and lower alkanoylamino, and quaternary ammonium derivatives, N-oxides and physiologically tolerable acid addition salts thereof.

15. A poultry feedstuff or feed premix thereof as claimed in claim 14 containing a member selected from the group consisting of 2-(5'-nitrofurfurylidenemethyl)-quinoline which carries a free amino group on the quinoline ring, an N-oxide and a non-toxic salt thereof.

16. A poultry feedstuff or feed premix thereof as claimed in claim 14 containing a member selected from the group consisting of 4-(5'-nitrofurfurylidenemethyl)-quinoline which carries a free amino group on the quinoline ring, N-oxide and a non-toxic salt thereof.

17. A poultry feedstuff or feed premix thereof as claimed in claim 14 containing a member selected from the group consisting of 2-(5-nitro-furfurylidenemethyl)-quinoline and an N-oxide thereof.

18. A poultry feedstuff or feed premix thereof as claimed in claim 14 containing a member selected from the group consisting of 4-(5-nitro-furfurylidenemethyl)-quinoline and an N-oxide thereof.

19. A poultry feedstuff or feed premix thereof as claimed in claim 14 containing a member selected from the group consisting of 2-(5-nitro-furfurylidenemethyl)-6-methylpyridine and an N-oxide thereof.

20. A poultry feedstuff or feed premix thereof as claimed in claim 14 containing a member selected from the group consisting of 4-(5-nitro-furfurylidenemethyl)-6-methylpyridine and an N-oxide thereof.

21. A poultry feedstuff or feed premix thereof as claimed in claim 14 containing a member selected from the group consisting of 4-(5'-nitro-furfurylidenemethyl)-2-amino-quinoline, an N-oxide and a non-toxic salt thereof.

22. A poultry feedstuff or feed premix thereof as claimed in claim 14 containing a member selected from the group consisting of 2-(5'-nitro-furfurylidenemethyl)-8-amino-quinoline, an N-oxide and a non-toxic salt thereof.

23. A poultry feedstuff or feed premix thereof as claimed in claim 14 containing a member selected from the group consisting of 2-(5'-nitro-furfurylidenemethyl)-6-amino-quinoline, an N-oxide and a non-toxic salt thereof.

References Cited

UNITED STATES PATENTS

| | | | |
|---|---|---|---|
| 2,906,752 | 9/1959 | Howard | 99—2 X |
| 3,004,888 | 10/1961 | Conover et al. | 167—52.1 X |
| 3,031,447 | 4/1962 | Saikachi et al. | 167—53.1 X |
| 3,041,334 | 6/1962 | Klein | 167—53.1 X |

A. LOUIS MONACELL, *Primary Examiner.*

H. H. KLARE, *Assistant Examiner.*

CASE 4759/1-3/CIP/3

PO-1050
(5/69)

UNITED STATES PATENT OFFICE
CERTIFICATE OF CORRECTION

Patent No. 3,352,683      Dated November 14, 1967

Inventor(s) Paul Schmidt et al

It is certified that error appears in the above-identified patent and that said Letters Patent are hereby corrected as shown below:

Column 2, in the formula, lines 25-29,

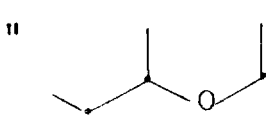 should be 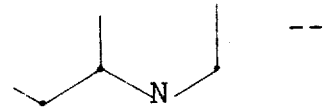

Column 7, line 62 "melting point 151-152°C." should be deleted and reinserted at line 59.

Column 11, in the formula, lines 60-67,

 should be 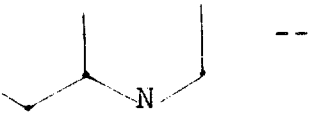

Column 12, line 2, "(5-nitro" should be -- (5'-nitro --; line 13, "claim 1" should be -- claim 13 --.

SIGNED AND
SEALED
JUL 21 1970

(SEAL)
Attest:

Edward M. Fletcher, Jr.
Attesting Officer

WILLIAM E. SCHUYLER, JR.
Commissioner of Patents